(12) United States Patent
Shepelev et al.

(10) Patent No.: US 10,318,084 B2
(45) Date of Patent: Jun. 11, 2019

(54) METHODS AND SYSTEMS FOR MATRIX ELECTRODE ARRAYS

(71) Applicant: Synaptics Incorporated, San Jose, CA (US)

(72) Inventors: Petr Shepelev, Campbell, CA (US); Tetsuo Tanemura, Tokyo (JP); Nobukazu Tanaka, Tokyo (JP); Takayuki Noto, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 15/707,213

(22) Filed: Sep. 18, 2017

(65) Prior Publication Data

US 2019/0087029 A1   Mar. 21, 2019

(51) Int. Cl.
| | |
|---|---|
| G06F 3/044 | (2006.01) |
| G06F 1/16 | (2006.01) |
| G06F 3/041 | (2006.01) |
| G09G 3/36 | (2006.01) |
| G09G 3/20 | (2006.01) |
| G02F 1/1333 | (2006.01) |
| G09G 3/3208 | (2016.01) |

(52) U.S. Cl.
CPC .......... *G06F 3/044* (2013.01); *G02F 1/13338* (2013.01); *G06F 1/1643* (2013.01); *G06F 3/0412* (2013.01); *G06F 3/0414* (2013.01); *G06F 3/0416* (2013.01); *G09G 3/20* (2013.01); *G09G 3/3208* (2013.01); *G09G 3/3677* (2013.01)

(58) Field of Classification Search
CPC ........ G06F 3/041–3/048; G06F 3/0412; G06F 3/0416; G06F 2203/04107; G06F 3/047; G02F 1/13338; G02F 2001/13629; G01R 31/11; G01R 31/024; G01R 31/021; G01R 27/2605
See application file for complete search history.

(56) References Cited

U.S. PATENT DOCUMENTS

| | | | | |
|---|---|---|---|---|
| 8,314,351 | B2* | 11/2012 | Reynolds | G06F 3/041 178/19.07 |
| 9,606,686 | B2* | 3/2017 | Reynolds | G06F 3/0412 |
| 2013/0335252 | A1* | 12/2013 | Roberson | G06F 3/0416 341/173 |
| 2014/0132552 | A1* | 5/2014 | Hoch | G06F 3/044 345/174 |
| 2014/0267127 | A1* | 9/2014 | Solven | G06F 3/0416 345/174 |

(Continued)

*Primary Examiner* — Sanjiv D. Patel
(74) *Attorney, Agent, or Firm* — Ferguson Braswell Fraser Kubasta PC

(57) ABSTRACT

An input device may include a matrix electrode array that includes various transmitter electrodes and various receiver electrodes. The transmitter electrodes may be disposed in a first direction. The receiver electrodes may be disposed in a second direction that is substantially parallel with the first direction. The input device may further include a first set of routing traces coupled to the transmitter electrodes and disposed underneath the transmitter electrodes in the first direction. The input device may further include a second set of routing traces coupled to the receiver electrodes and disposed underneath the receiver electrodes in the second direction.

18 Claims, 13 Drawing Sheets

(56) References Cited

U.S. PATENT DOCUMENTS

| | | | |
|---|---|---|---|
| 2015/0084876 A1* | 3/2015 | Schwartz | G06F 3/0418 345/173 |
| 2015/0091838 A1* | 4/2015 | Tanemura | G06F 3/044 345/174 |
| 2015/0091849 A1* | 4/2015 | Ludden | G06F 3/0412 345/174 |
| 2015/0116254 A1* | 4/2015 | Solven | G06F 3/044 345/174 |
| 2015/0261377 A1* | 9/2015 | Reynolds | G06F 3/0416 345/174 |
| 2016/0110008 A1* | 4/2016 | Lee | G06F 3/0416 345/174 |
| 2016/0183382 A1* | 6/2016 | Solven | G06F 3/044 345/174 |
| 2017/0140194 A1* | 5/2017 | Qin | G06F 3/044 |
| 2017/0255294 A1* | 9/2017 | Shepelev | G06F 3/0418 |

* cited by examiner

Capacitive Scan A 501

|        | Column 1 | Column 2 | Column 3 |
|--------|----------|----------|----------|
| Row 1  | AFE Y    | Guarded  | AFE Y    |
| Row 2  | AFE X    |          | AFE Z    |
| Row 3  | AFE X    |          | AFE Z    |
| Row 4  | AFE X    |          | AFE Z    |

*FIG. 5A*

Capacitive Scan B 502

|        | Column 1 | Column 2 | Column 3 |
|--------|----------|----------|----------|
| Row 1  | AFE X    | Guarded  | AFE Z    |
| Row 2  | AFE Y    |          | AFE Y    |
| Row 3  | AFE X    |          | AFE Z    |
| Row 4  | AFE X    |          | AFE Z    |

*FIG. 5B*

Capacitive Scan C 503

|        | Column 1 | Column 2 | Column 3 |
|--------|----------|----------|----------|
| Row 1  | AFE X    |          | AFE Z    |
| Row 2  | AFE X    | Guarded  | AFE Z    |
| Row 3  | AFE X    |          | AFE Z    |
| Row 4  | AFE Y    |          | AFE Y    |

*FIG. 5C*

METHODS AND SYSTEMS FOR MATRIX ELECTRODE ARRAYS

FIELD

This disclosed technology generally relates to electronic devices and specifically to capacitive sensing matrix electrode arrays.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Moreover, input devices may include a matrix electrode array of sensor electrodes that perform transcapacitive or absolute capacitive scans of a sensing region. However, the arrangement of sensor electrodes in the matrix electrode array may contribute various amounts of background capacitance between different sensor electrodes. Accordingly, improved techniques are desired that utilize reduce such background capacitance.

SUMMARY

In general, in one aspect, the disclosed technology relates to an input device. The input device includes a matrix electrode array that includes various transmitter electrodes and various receiver electrodes. The transmitter electrodes are disposed in a first direction. The receiver electrodes are disposed in a second direction that is substantially parallel with the first direction. The input device further includes a first set of routing traces coupled to the transmitter electrodes and disposed underneath the transmitter electrodes in the first direction. The input device further includes a second set of routing traces coupled to the receiver electrodes and disposed underneath the receiver electrodes in the second direction.

In general, in one aspect, the disclosed technology relates to a processing system. The processing system includes a sensor module configured to transmit various sensing signals along various transmitter electrodes. The sensor module is further configured to obtain, using an analog front-end (AFE), a first resulting signal from a first receiver electrode among various receiver electrodes in response to transmitting a sensing signal among the sensing signals. The sensor module is further configured to obtain, using the AFE, a second resulting signal from a second receiver electrode among the receiver electrodes in response to transmitting a second sensing signal among the sensing signals. The processing system further includes a determination module configured to select the first receiver electrode based at least in part on an AFE electrode sequence. The second receiver electrode follows the first receiver electrode in the AFE electrode sequence. The determination module is further configured to determine, using the first resulting signal and the second resulting signal, object information regarding an input object that is located in a sensing region of an input device.

In general, in one aspect, the disclosed technology relates to a method of capacitive sensing. The method includes selecting, based on an analog front-end (AFE) sequence, a first receiver electrode among various receiver electrodes. The method further includes transmitting a first sensing signal along a transmitter electrode. The method further includes obtaining, using an AFE, a first resulting signal from the first receiver electrode in response to transmitting the first sensing signal. The method further includes transmitting a second sensing signal along the transmitter electrode. The method further includes obtaining, using the AFE, a second resulting signal from a second receiver electrode among the receiver electrodes. The second receiver electrode follows the first receiver electrode in the AFE electrode sequence. The method further includes determining, using the first resulting signal and the second resulting signal, object information regarding an input object that is located in a sensing region of an input device.

Other aspects of the disclosed technology will be apparent from the following description and the appended claims.

BRIEF DESCRIPTION OF DRAWINGS

FIG. 5A shows an example in accordance with one or more embodiments.

FIG. 5B shows an example in accordance with one or more embodiments.

FIG. 5C shows an example in accordance with one or more embodiments.

DETAILED DESCRIPTION

Figure 1:
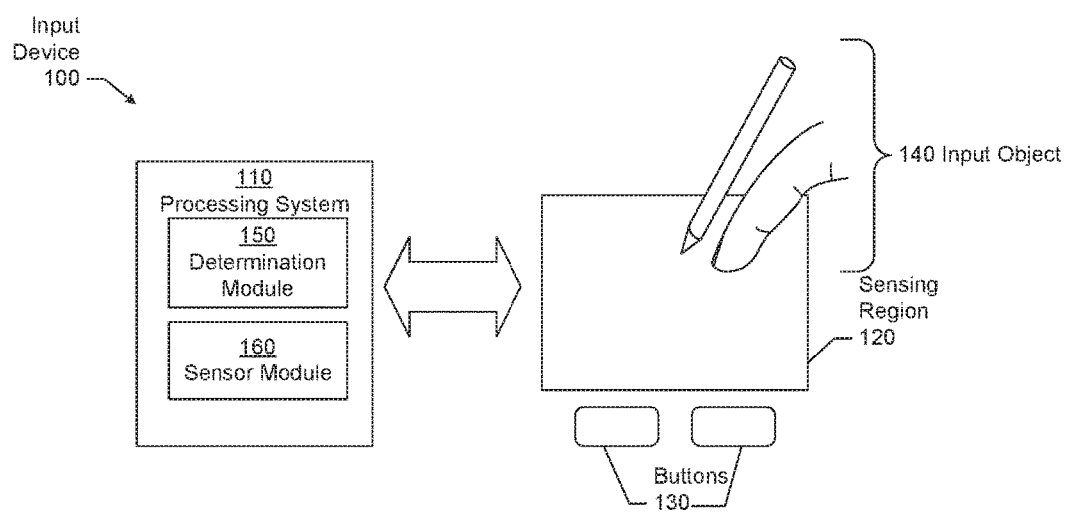
FIG. 1 shows a block diagram of an example system that includes an input device in accordance with one or more embodiments.

Specific embodiments of the disclosed technology will now be described in detail with reference to the accompanying figures. Like elements in the various figures may be denoted by like reference numerals and/or like names for consistency.

The following detailed description is merely exemplary in nature, and is not intended to limit the disclosed technology or the application and uses of the disclosed technology. Furthermore, there is no intention to be bound by any expressed or implied theory presented in the preceding technical field, background, brief summary or the following detailed description.

In the following detailed description of embodiments of the disclosed technology, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present disclosed technology provide input devices and methods that facilitate improved usability. In particular, one or more embodiments of the disclosed technology are directed to an input device with a matrix electrode array. In particular, the matrix electrode array may include columns of receiver electrodes and columns of transmitter electrodes. Specifically, routing traces for the receiver electrodes may only overlap receiver electrodes, while routing traces for the transmitter electrodes may only overlap transmitter electrodes. Thus, in one or more embodiments, the routing trace implementation among sensor electrodes in the matrix electrode array may reduce capacitive contributions to the capacitive baseline in the input device.

Furthermore, receiver electrode columns may be designated one or more analog front-ends. For example, an analog front-end may alternate between different receiver electrodes in a respective receiver electrode column to obtain various capacitive measurements, e.g., for a transcapacitive image. In particular, receiver electrodes in a respective column may be selected according to an analog front-end electrode sequence. Specifically, an analog front-end electrode sequence may describe the order that an analog front-end uses different receiver electrodes in the same column and/or in different columns. Thus, receiver-side multiplexing may be implemented at one or more analog front-ends through an analog front-end electrode sequence.

Turning now to the figures, FIG. 1 is a block diagram of an exemplary input device (100), in accordance with embodiments of this disclosed technology The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices (100), such as physical keyboards that include input device (100) and separate joysticks or key switches. Further example electronic systems include peripherals, such as data input devices (100) (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device (100).

The input device (100) may be implemented as a physical part of the electronic system, or may be physically separate from the electronic system. Further, portions of the input device (100) may be part of the electronic system. For example, all or part of the determination module (150) may be implemented in the device driver of the electronic system. As appropriate, the input device (100) may communicate with parts of the electronic system using any one or more of the following: buses, networks, and other wired or wireless interconnections. Example communication protocols include I2C, SPI, PS/2, Universal Serial Bus (USB), Bluetooth®, RF, and IrDA protocols.

In FIG. 1, the input device (100) is shown as a proximity sensor device (also often referred to as a "touchpad" or a "touch sensor device") configured to sense input provided by one or more input objects (140) in a sensing region (120). Example input objects (140) include fingers and styli, as shown in FIG. 1. Throughout the specification, the singular form of input object (140) may be used. Although the singular form is used, multiple input objects (140) may exist in the sensing region (120). Further, the particular input objects (140) in the sensing region (120) may change over the course of one or more gestures. To avoid unnecessarily complicating the description, the singular form of input object (140) is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions (120) may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device (100) may be referred to as the above surface sensing region (120). The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that includes no contact with any surfaces of the input device (100), contact with an input surface (e.g., a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) may include one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some capacitive implementations of the input device (100), voltage or current is applied to create an electric field. Nearby input objects (140) cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object (140). In various embodiments, an input object (140) near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects (140). The reference voltage may be a substantially constant voltage or a varying voltage, and in various embodiments, the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object (140) near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter signals may be electrically applied to transmitter electrodes, where the transmitter signals may be relative to a reference voltage (e.g., system ground). Receiver sensor electrodes may be held substantially constant relative to the reference voltage to facilitate receipt of resulting signals. The reference voltage may be a substantially constant voltage and, in various embodiments, the reference voltage may be system ground. The transmitter electrodes may be electrically driven with respect to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects (140) and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system (110) for a mutual capacitance sensor device may include transmitter circuitry configured to transmit signals with transmitter sensor electrodes, and/or receiver circuitry configured to receive signals with receiver sensor electrodes. Further, a processing system (110) for an absolute capacitance sensor device may include driver circuitry configured to drive absolute capacitance signals onto sensor electrodes, and/or receiver circuitry configured to receive signals with those sensor electrodes. In one or more embodiments, a processing system (110) for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators/mechanisms (not shown), etc.

The processing system (110) may be implemented as a set of modules that handle different functions of the processing system (110). Each module may include circuitry that is a part of the processing system (110), firmware, software, and/or a combination thereof. In various embodiments, different combinations of modules may be used. For example, as shown in FIG. 1, the processing system (110) may include a determination module (150) and a sensor module (160). The determination module (150) may include functionality to determine when at least one input object (140) is in a sensing region (120), determine signal to noise ratio, determine positional information of an input object (140), identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensor circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Alternative or additional modules may exist in accordance with one or more embodiments. Such alternative or additional modules may correspond to distinct modules or sub-modules of one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system (110) as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, haptic actuation, and other functions. In some embodiments, the processing system (110) provides information about the input (or lack of input) to some part of the electronic system (e.g., to a central processing system (110) of the electronic system that is separate from the processing system (110), if such a separate central processing system (110) exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system (110). These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light-emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments are described in the context of a fully-functioning apparatus, the mechanisms of the various embodiments are capable of being distributed as a program product (e.g., software) in a variety of forms. For example, the mechanisms of various embodiments may be implemented and distributed as a software program on information-bearing media that are readable by electronic processors (e.g., non-transitory computer-readable and/or recordable/writable information bearing media that is readable by the processing system (110)). Additionally, the embodiments may apply equally regardless of the particular type of medium used to carry out the distribution. For example, software instructions in the form of computer readable program code to perform one or more embodiments may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system (110), the input device (100), and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments may be implemented on a distributed system having several nodes, where each portion an embodiment may be located on a different node within the distributed system. In one or more embodiments, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the disclosed technology. For example, various components may be combined to create a single component. As another example, the functionality performed by a single component may be performed by two or more components. Accordingly, for at least the above-recited reasons, embodiments of the disclosed technology should not be considered limited to the specific arrangements of components and/or elements shown in FIG. 1.

Figure 2A:
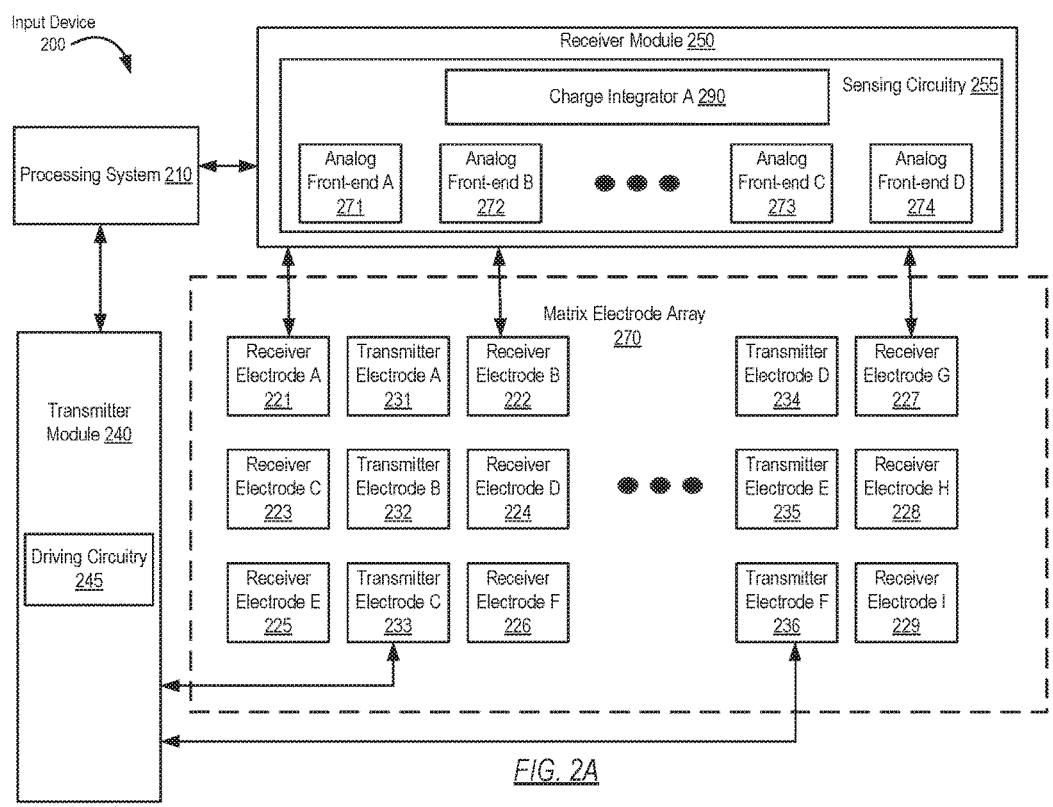
FIG. 2A shows a schematic view of an input device in accordance with one or more embodiments.

Turning to FIG. 2A, FIG. 2A shows a schematic view of an input device (200) in accordance with one or more embodiments. As shown in FIG. 2A, the input device (200) may include a receiver module (250), a transmitter module (240), and a processing system (210). The processing system (210) may be similar to processing system (110) described in FIG. 1 and the accompanying description and/or the computing system (700) described in FIG. 7 and the accompanying description. The transmitter module (240) may include driving circuitry (245) that may be similar to transmitter circuitry described in FIG. 1 and the accompanying description. For example, driving circuitry (245) may include hardware and/or software that includes functionality to generate one or more sensing signals transmitted over one or more transmitter electrodes (e.g., transmitter electrode A (231), transmitter electrode B (232), transmitter electrode C (233), transmitter electrode D (234), transmitter electrode E (235), transmitter electrode F (236)). The transmitter electrodes (231, 232, 233, 234, 235, 236) may be similar to the transmitter electrodes described in FIG. 1 and the accompanying description. Likewise, various routing traces (not shown), such as gate lines and source lines, may couple driving circuitry (245) with the transmitter electrodes (231, 232, 233, 234, 235, 236).

Moreover, the receiver module (250) may include sensing circuitry (255). For example, sensing circuitry (255) may include hardware and/or software that includes functionality to obtain one or more resulting signals from one or more receiver electrodes (e.g., receiver electrode A (221), receiver electrode B (222), receiver electrode C (223), receiver electrode D (224), receiver electrode E (225), receiver electrode F (226), receiver electrode G (227), receiver electrode H (228), receiver electrode I (229)) in response to one or more sensing signals transmitted over the transmitter electrodes (231, 232, 233, 234, 235, 236). The sensing circuitry (255) may be similar to the receiver circuitry described in FIG. 1 and the accompanying description.

In particular, the sensing circuitry (255) may include various analog front-ends (e.g., analog front-end A (271), analog front-end B (272), analog front-end C (273), analog front-end D (274)), which may include various analog conditioning circuitry. For example, analog-front ends may include operational amplifiers, digital-signal processing components, charge collection mechanisms, filters, and various application-specific integrated circuits for detecting and analyzing resulting signals obtained from the receiver electrodes (221, 222, 223, 224, 225, 226, 227, 228, 229). Likewise, the receiver electrodes (221, 222, 223, 224, 225, 226, 227, 228, 229) may be similar to the receiver electrodes described in FIG. 1 and the accompanying description. Likewise, various routing traces (not shown) may couple sensing circuitry (255) with the receiver electrodes (221, 222, 223, 224, 225, 226, 227, 228, 229).

In one or more embodiments, the input device (200) includes a matrix electrode array (e.g., matrix electrode array (270)). For example, the matrix electrode array (270) may include various sensor electrodes, such as the transmitter electrodes (231, 232, 233, 234, 235, 236) and the receiver electrodes (221, 222, 223, 224, 225, 226, 227, 228, 229). Likewise, sensor electrodes in a matrix electrode array may be disposed according to a predetermined shape, such as a square, rectangle, circle, regular and irregular shapes, and/or other geometric shapes. In one or more embodiments, for example, transmitter electrodes and receiver electrodes are arranged in respective column arrangements similar to the sensor electrode arrangement shown in FIG. 2A. For more information regarding column arrangements for receiver electrodes and/or transmitter electrodes, see FIGS. 3A, 3B, 3C, and 3D below and the accompanying description.

Figure 2B:
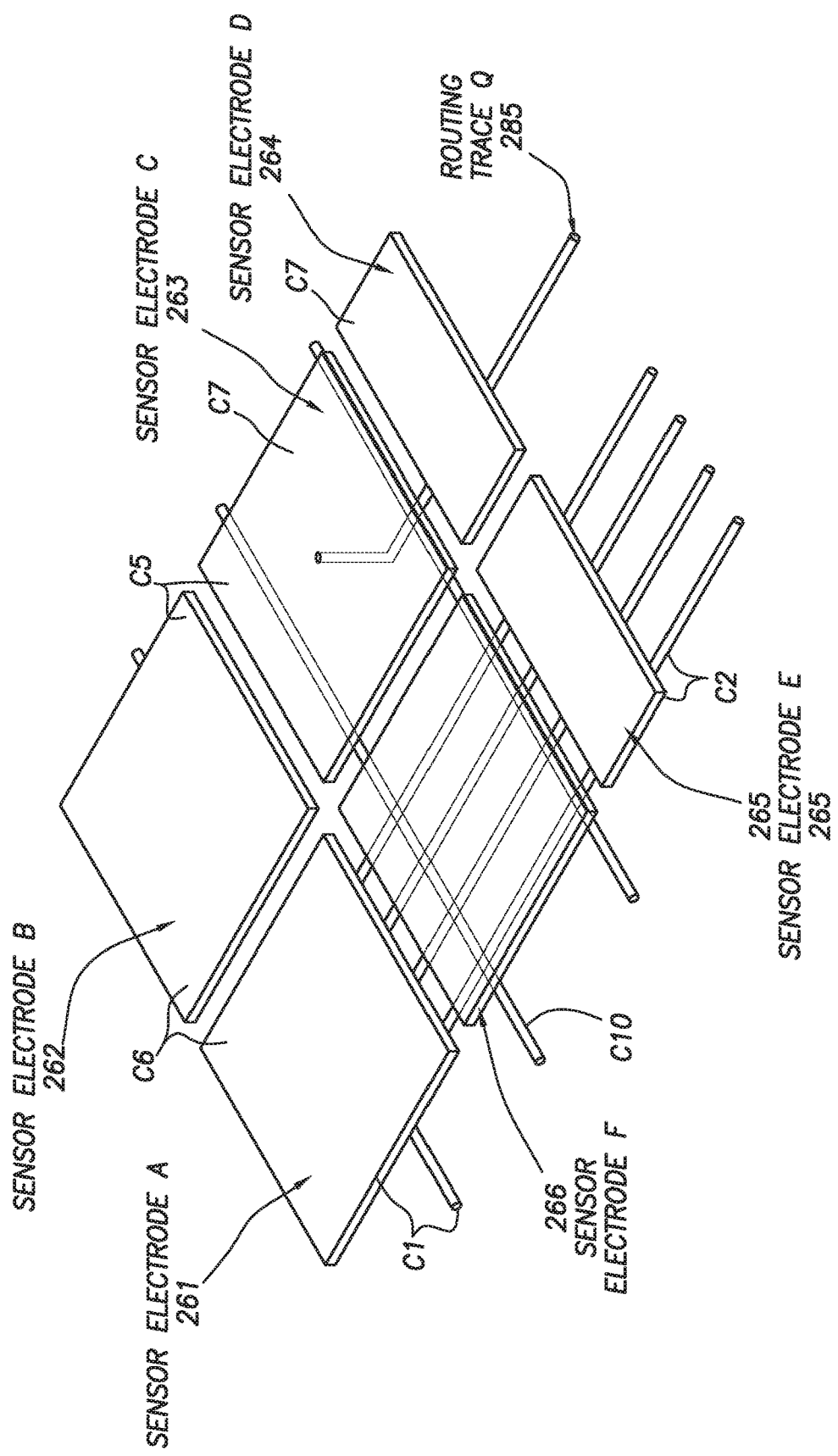
FIG. 2B shows a capacitance diagram in accordance with one or more embodiments.

Turning to FIG. 2B, FIG. 2B shows a capacitance diagram between various components of an input device in accordance with one or more embodiments. As shown in FIG. 2B, various sensor electrodes (e.g., sensor electrode A (261), sensor electrode B (262), sensor electrode C (263), sensor electrode D (264), sensor electrode E (265), sensor electrode F (266)) are disposed in an input device (not shown) along with various routing traces, such as routing trace Q (285), gate lines, source lines, and data lines. In particular, C1 is the capacitance between sensor electrode A (261) and a gate line. C2 is the capacitance between sensor electrode E (265) and various data lines. C5 is the capacitance between sensor electrode B (262) and sensor electrode C (263). C7 is a parallel plate capacitance between sensor electrode C (263) and routing trace Q (285). C10 is a gate line parasitic capacitance. As such, C7 may contribute to a capacitive baseline of a transcapacitive image that is obtained with the input device (200).

Figure 2C:
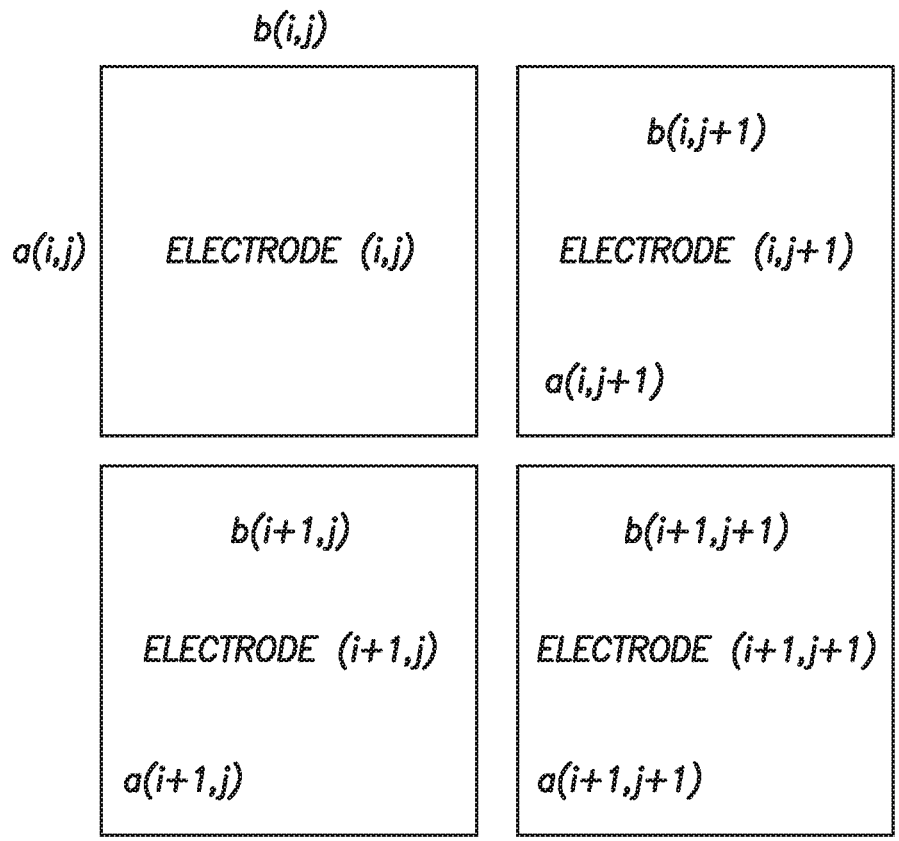
FIG. 2C shows a capacitance diagram of an example system in accordance with one or more embodiments.

Turning to FIG. 2C, FIG. 2C shows a capacitance diagram illustrating components of a trans-capacitive signal in accordance with one or more embodiments. As shown in FIG. 2C, sensor electrodes are arranged in accordance with a row index i and a column index j of a matrix electrode array. For example, electrode (i, j) may be the top-left sensor electrode in the matrix electrode array. Accordingly, the transcapacitive signal at a sensor electrode may include an $a(i, j)$ capacitance component and a $b(i, j)$ capacitance component. In one or more embodiments, where receiver electrodes and transmitter electrodes are disposed in a column-arrangement, the $b(i, j)$ capacitive component may not contribute to the capacitive baseline and/or a change in transcapacitance of a transcapacitive signal at a particular sensor electrode.

Turning to FIGS. 3A, 3B, 3C, and 3D, FIGS. 3A, 3B, 3C, and 3D provide examples of sensor electrode arrangements within an input device. The following examples are for explanatory purposes only and not intended to limit the scope of the disclosed technology.

Figure 3A:
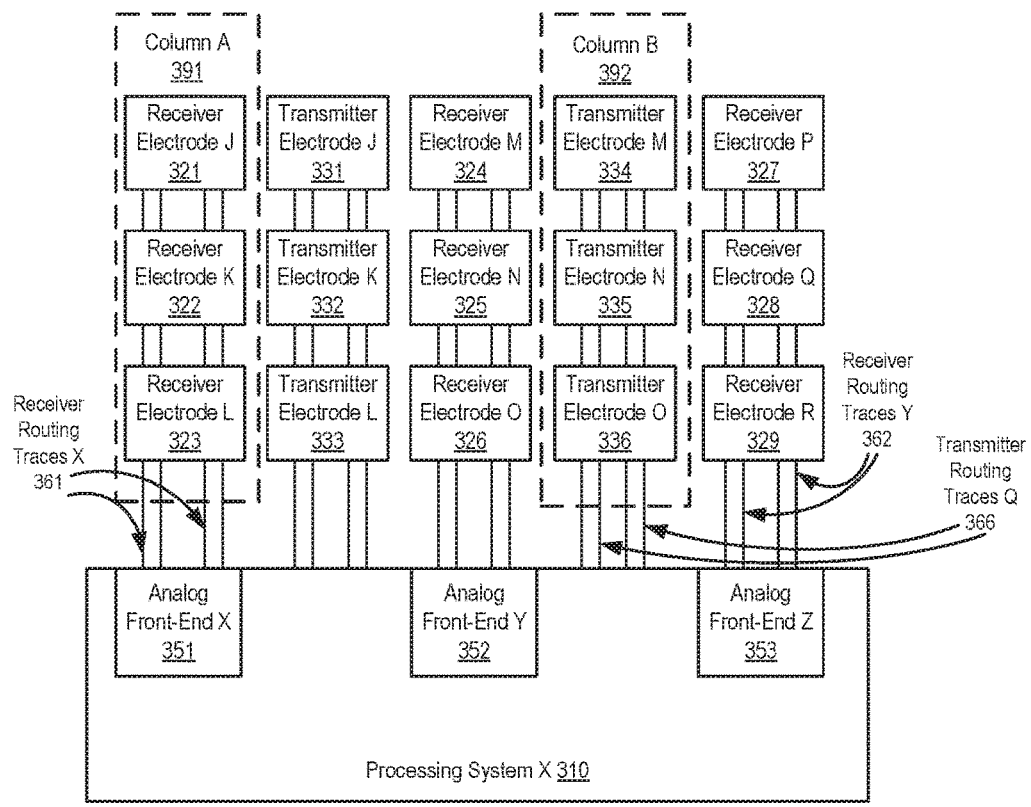
FIG. 3A shows an example in accordance with one or more embodiments.

Turning to FIG. 3A, FIG. 3A shows a matrix electrode array that includes various receiver electrodes (i.e., receiver electrode J (321), receiver electrode K (322), receiver electrode L (323), receiver electrode M (324), receiver electrode N (325), receiver electrode O (326), receiver electrode P (327), receiver electrode Q (328), receiver electrode R (329)) and various transmitter electrodes (i.e., transmitter electrode J (331), transmitter electrode K (332), transmitter electrode L (333), transmitter electrode M (334), transmitter electrode N (335), transmitter electrode O (336)). As shown, various receiver routing traces (e.g., receiver routing traces X (361), receiver routing traces Y (362)) couple a processing system X (310) to respective receiver electrodes. In particular, various analog front-ends (i.e., analog front-end X (351), analog front-end Y (352), analog front-end Z (353)) obtain various resulting signals from the respective receiver electrodes for further processing by the processing system X (310).

Keeping with FIG. 3A, receiver electrodes and transmitter electrodes are arranged in respective columns. For example, column A (391) includes only receiver electrodes (i.e., receiver electrode J (321), receiver electrode K (322), receiver electrode L (323)) while column B (392) includes only transmitter electrodes (i.e., transmitter electrode M (334), transmitter electrode N (335), transmitter electrode O (336)). As shown, the routing of the receiver routing traces X (361) follows column A (391) to the analog front-end X (351). As such, the receiver routing traces X (361) do not contribute additional capacitance that is measured at the processing system X (310). For example, disposing receiver routing traces X (361) along column A (391) eliminates a capacitance contribution similar to the C7 capacitance that is described above in FIG. 2B. Likewise, the transmitter routing traces Q (366) span the transmitter electrodes of column B (392) to driving circuitry (not shown) in the processing system X (310). Accordingly, by keeping the transmitter routing traces Q (366) from overlapping any receiver electrodes, the transmitter routing traces Q (366) may also avoid contributing additional capacitance to resulting signals obtained over the receiver routing traces X (361).

Figure 3B:
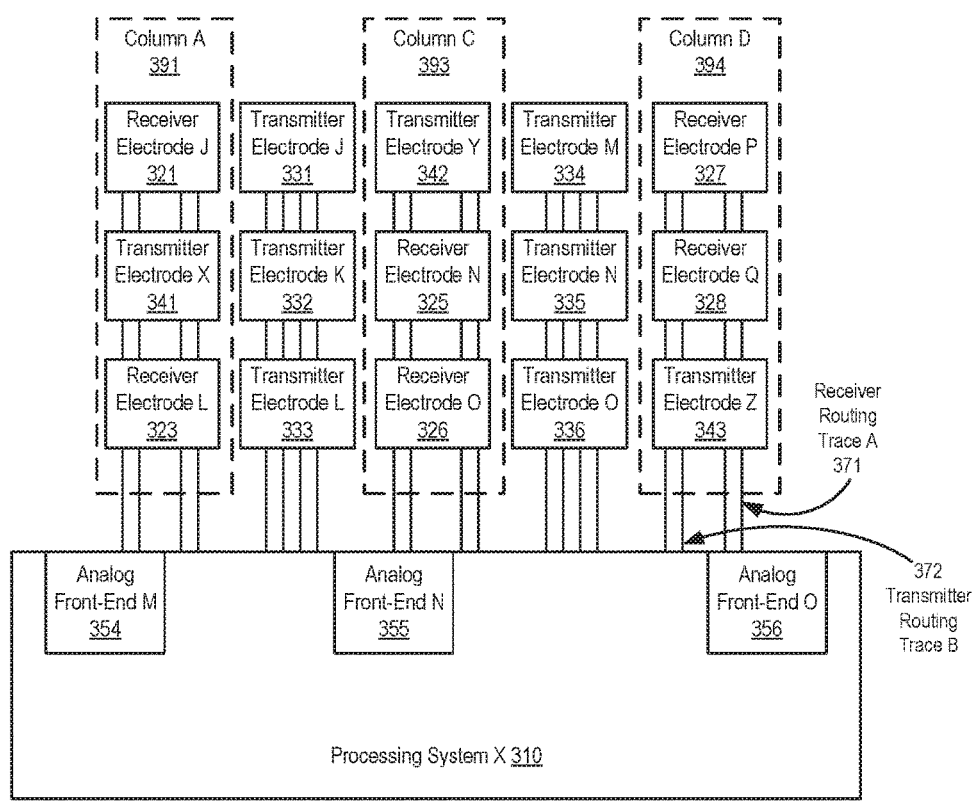
FIG. 3B shows an example in accordance with one or more embodiments.

Turning to FIG. 3B, FIG. 3B shows an arrangement of receiver electrodes and transmitter electrodes similar to FIG. 3A. However, as shown in column A (391), column C (393), and column D (394) of FIG. 3B, a monitoring electrode (i.e., transmitter electrode X (341), transmitter electrode Y (342), transmitter electrode Z (343)) is added to each receiver electrode column. In one or more embodiments, for example, the monitoring electrode is a transmitter electrode in a receiver electrode column that is used to detect open circuits and/or short circuits within the input device. In particular, a special sensing mode may be used with a monitoring electrode in production tests to detect open circuits between receiver electrodes and receiver routing traces. For example, a series of sensing signal bursts may provide a stimulus applied over transmitter routing trace B (372)) to identify whether receiver electrode P (327) and receiver electrode Q (328) are ohmically connected to receiver routing trace A (371). As such, various mutual capacitance measurements may be analyzed among the monitoring electrode, other transmitter electrodes, and various receiver electrodes to identify vertical and/or horizontal shorts and/or open circuits. For example, the mutual capacitance measurements may be compared with mutual capacitive measurements from another input device. Moreover, the special sensing mode may include a loop with a pair of transmitter-receiver electrodes. For an open circuit, an increased resistance in the loop decreases a measurement of mutual capacitance in the pair of transmitter-receiver electrodes. Likewise, a short circuit may increase a measurement of mutual capacitance. Thus, a monitoring electrode may also be used to detect shorts between neighboring sensor electrodes in the horizontal direction by using the a(i,j) component described above in FIG. 2C and the accompanying description.

Figure 3C:
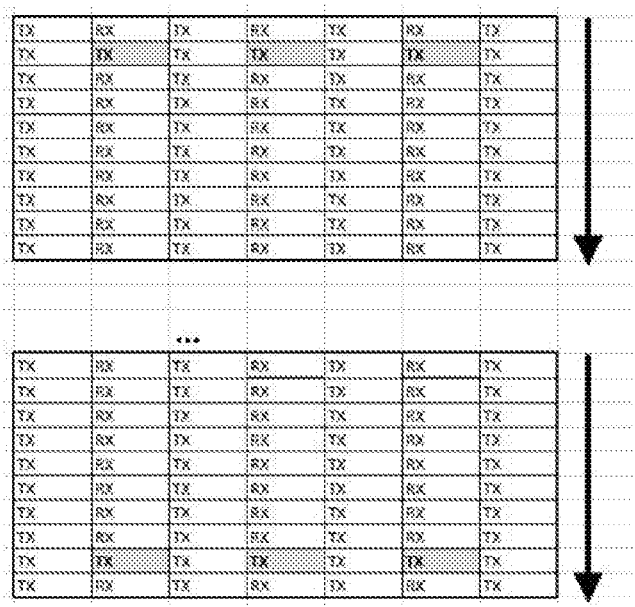
FIG. 3C shows an example in accordance with one or more embodiments.
Figure 3D:
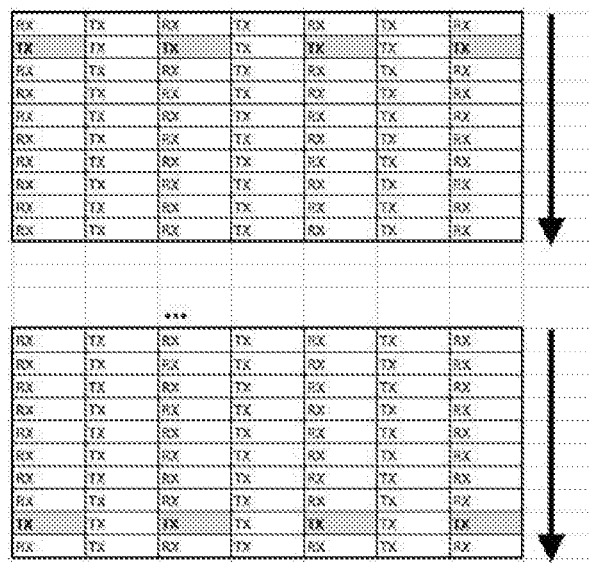
FIG. 3D shows an example in accordance with one or more embodiments.

Turning to FIGS. 3C and 3D, FIGS. 3C and 3D illustrate transmitter electrodes (TX) and receiver electrodes (RX) where the column direction is substantially parallel to the direction of routing traces toward a processing system (310). In FIG. 3C, the lone transmitter electrode in the second, fourth, and sixth columns from the left-hand side are used for detecting open circuits and/or short circuits in the respective receiver electrode column. In FIG. 3D, the column of receiver electrodes is swapped with a column of transmitter electrodes in order to detect open circuits and/or short circuits in other sensor electrode columns.

Returning to FIG. 2A, in one or more embodiments, transmitter electrodes and/or routing traces are configured based on various types analog front-ends. For example, in one type of analog front-end, the analog front-end may include and/or be coupled with a charge integrator. In another type of analog front-end, the analog front-end may be configured to operate using a current conveyor. Accordingly, an analog front-end may include an input terminal and a reference terminal. The input terminal may receive a resulting signal from a receiver electrode, while the reference terminal may be set to a DC voltage or a modulated voltage.

Moreover, various modes may be implemented with a particular analog front-end. In one mode, where a DC voltage is used at the reference terminal, sensing signals transmitted to transmitter electrodes may be modulated. Likewise, gate lines may be set to one or more DC voltage levels, while source lines may be set to one or more DC voltage levels or a high impedance (HiZ) level. In another mode, where a modulated signal is applied to the reference terminal, transmitter electrodes may be set at one or more DC voltage levels. As such, the gate lines may be guarded with a modulation signal with a similar waveform as the modulated signal applied to the reference terminal. The source lines may be similarly guarded in the manner as the gate lines or set to a HiZ level. The different modes of an analog front-end may be implemented with respect to transmitter electrodes for capacitive sensing as well as sensor electrodes used for display updating.

Keeping with FIG. 2A, the sensing circuitry (255) may include one or more charge integrators (e.g., charge integrator A (290)). In particular, a charge integrator may include hardware and/or software that includes functionality for transforming one or more resulting signals into a voltage output proportional a respective resulting signal. For example, a charge integrator may include an amplifier with an input terminal and a reference terminal that is configured in a similar manner as described above with respect to the input terminal and reference terminal of the analog front-end. Thus, charge integrator A (290) may include one or more amplifiers, various feedback capacitors, and other circuit components.

The sensing circuitry (255) may further include one or more current conveyors. For example, a current conveyor may include hardware and/or software for replicating a resulting signal and/or an approximation of a resulting signal. A current conveyor may also be configured according to one or more modes describes above with respect to the various types of analog front-ends.

Figure 4:
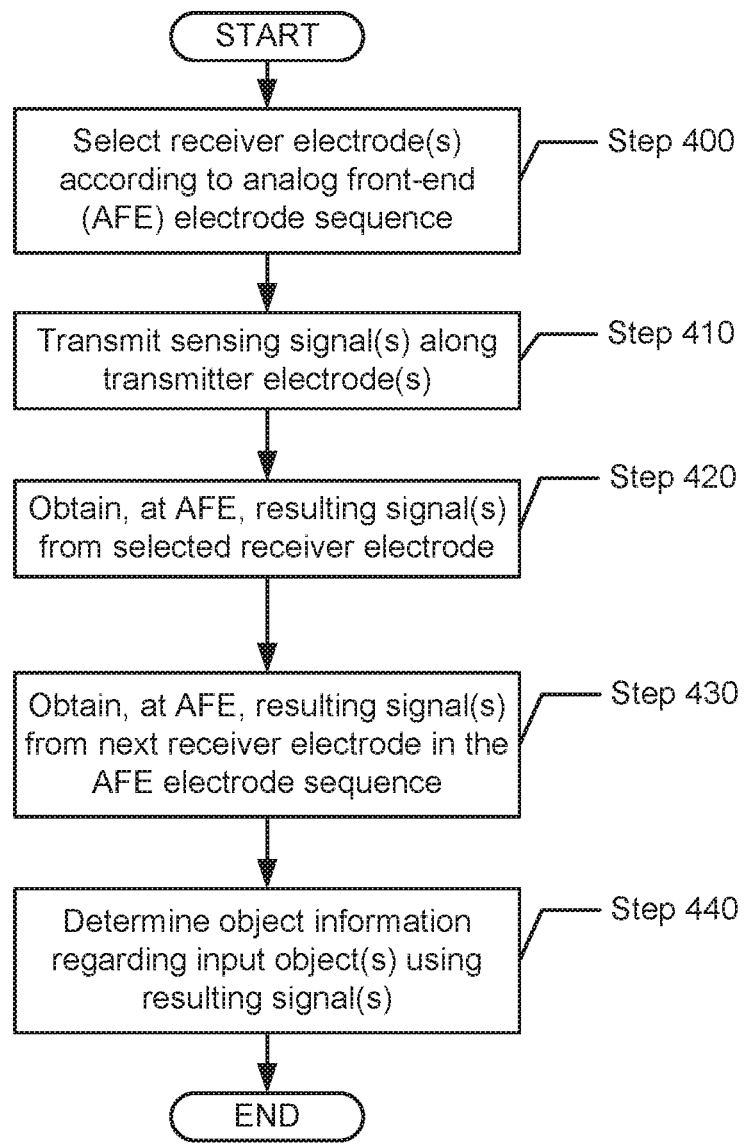
FIG. 4 shows a flowchart of an example system in accordance with one or more embodiments.

Turning to FIG. 4, FIG. 4 shows a flowchart in accordance with one or more embodiments. Specifically, FIG. 4 describes a method for performing capacitive sensing. The process shown in FIG. 4 may involve, for example, one or more components discussed above in reference to FIGS. 1, 2A, 3A and 3B (e.g., processing system (110)). While the various steps in FIG. 4 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 400, one or more receiver electrodes are selected according to an analog front-end electrode sequence (hereinafter "AFE electrode sequence") in accordance with one or more embodiments. An AFE electrode sequence may be a series of instructions that define an order that an analog front-end processes resulting signals from different receiver electrodes in a matrix electrode array. For example, an AFE electrode sequence may be stored in hardware, software, and/or firmware within an input device. Likewise, a processing system may generate an AFE electrode sequence based on one or more capacitive scans to be performed using the matrix electrode array. In one or more embodiments, for example, an AFE electrode sequence identifies respective receiver electrodes, e.g., by specifying a row and a column, associated with an analog front-end. Accordingly, a processing system may read the AFE electrode sequence and iteratively select a respective receiver electrode for a capacitive scan.

In one or more embodiments, the same AFE electrode sequence is used for different analog front-ends in a matrix electrode array. For example, a set of receiver electrodes in the matrix electrode array may form a cell that is repeated among groups of sensor electrodes throughout the matrix electrode array. For a particular capacitive scan, an AFE electrode sequence may identify a receiver electrode associated with an analog front-end for each cell in the matrix electrode array.

Moreover, by having multiple receiver electrodes ganged to a single analog front-end, an input device may increase the signal-to-noise ratio for proximity sensing of a sensing region. In one or more embodiments, for example, sensing signal modulation is kept the same along a column of transmitter electrodes, while the AFE electrode sequence designates different receiver electrodes to be selected rowwise sequentially for a particular analog front-end. As such, for a particular capacitive sensing frame, an AFE may obtain resulting signals from two receiver electrodes that are disposed in different receiver electrode columns in the matrix electrode array. The receiver electrode columns may be separated by one or more transmitter electrode columns in a similar manner as shown in FIGS. 3A and 3B above, for example. Moreover, having an analog front-end correspond to receiver electrodes only in a particular subset of columns in the matrix electrode array may minimize the length of analog traces on glass or inside silicon by reducing routing real estate and noise susceptibility.

Turning to FIGS. 5A, 5B, and 5C, FIGS. 5A, 5B, and 5C illustrate an example AFE electrode sequence. The following examples are for explanatory purposes only and not intended to limit the scope of the disclosed technology.

Turning to FIG. 5A, FIG. 5A shows an elemental block during capacitive scan A (501). In particular, FIG. 5A illustrates a receiver electrode column in column 1, a transmitter electrode column in column 2, and another receiver electrode column in column 3. In the capacitive scan A (501), the transmitter electrode column is set to a guard signal. Moreover, while FIG. 5A illustrates a portion of an example matrix electrode array, the remaining portion of the matrix electrode array may be organized as a repetition of elemental blocks similar to the one shown in FIG. 5A with different sets of receiver electrodes, transmitter electrodes, and analog front-ends. For example, FIG. 5A corresponds to three analog front-ends (i.e., AFE X, AFE Y, and AFE Z). Likewise, columns 4, 5, and 6 for rows 1, 2, and 3 in the matrix electrode array may correspond to three other analog front-ends.

Keeping with FIG. 5A, an AFE electrode sequence designates AFE X to three receiver electrodes, i.e., the receiver electrodes in rows 2, 3, and 4 of column 1. The AFE electrode sequence further designates AFE Y with two receiver electrodes in row 1 and in column 1 and column 3, and AFE Z with three receiver electrodes in column 3. In particular, within a receiver electrode column, one receiver electrode may be subject to capacitive sensing, i.e., the receiver electrode coupled with AFE Y, while the remaining three receiver electrodes in column 1 are connected to analog front-ends that maintain the same voltage potential along the same receiver electrode column. The capacitive scan may be sequenced multiple times, as shown in the capacitive scan (502) in FIG. 5B, and the capacitive scan (503) in FIG. 5C, where the receiver electrode that is used for capacitive sensing, i.e., the receiver electrode coupled to AFE Y, may be shifted each time.

Returning to FIG. 4, in Step 410, one or more sensing signals are transmitted along one or more transmitter electrodes in accordance with one or more embodiments. For example, the transmitter electrodes may be similar to the transmitter electrodes described in FIGS. 1, 2A, 3A, and 3B, and the accompanying description. Moreover, the one or more sensing signals may be transmitter signals as described in FIG. 1 and the accompanying description. In particular, sensor electrodes may switch between transmitter electrodes and receiver electrodes. Thus, based on a particular capacitive sensing operation in an input device, various transmitter electrode columns may be repurposed along with respective analog front-ends as a receiver electrode column.

Furthermore, guard signals may be transmitted over one or more sensor electrode columns in a matrix electrode array. In one or more embodiments, for example, analog front-ends normally connected to such sensor electrode columns during absolute capacitive sensing are detached and instead allocated to adjacent receiver electrode columns subject to capacitive sensing. Analog multiplexer circuitry with control logic may be implemented in an input device that connects a sensor electrode to an "odd" analog front-end or an "even" analog front-end.

In Step 420, one or more resulting signals are obtained at an analog front-end from a selected receiver electrode in accordance with one or more embodiments. For example, a resulting signal may be similar to the resulting signals described in FIG. 1 and the accompanying description. Thus, the analog front-end may obtain a resulting signal from a selected receiver electrode among a set of receiver electrodes spanning one or more sensor electrode columns. In one or more embodiments, for example, one or more analog front-ends are confined to a single sensor electrode column in a matrix electrode array. In particular, one analog front-end may be designated rows 1-4 of column 1 of the matrix electrode array, while a second analog front-end may be designated rows 5-8 of the same column. Thus, multiple analog front-ends may be paired together during a capacitive scan. Likewise, an analog front-end may correspond to multiple receiver electrodes in the same row of a matrix electrode array.

Moreover, non-selected receiver electrodes may be ganged together to maintain the same electric potential among the non-selected receiver electrodes in case of non-code division multiplexing sensing. Likewise, the non-selected receiver electrodes may acquire capacitive measurements corresponding to a sum of the opposite polarity in a code division multiplexing matrix.

In Step 430, one or more resulting signals are obtained at an analog front-end from a receiver electrode next in an AFE electrode sequence in accordance with one or more embodiments. According to the AFE electrode sequence, an analog front-end may switch to a receiver electrode in the same sensor electrode column or a different sensor electrode column. In one or more embodiments, for example, a resulting signal from Step 430 and a resulting signal from Step 420 are obtained in subsequent frames of a capacitive frame sequence, e.g., different capacitive scans of a transcapacitive image. For example, the next receiver electrode in the AFE electrode sequence may provide resulting signals for a different portion of a transcapacitive image from the resulting signals in Step 420. On the other hand, the next receiver electrode may correspond to a different capacitive image, such as for absolute capacitive sensing or transcapacitive sensing. Thus, the next receiver electrode may be selected iteratively by an input device, for example, until the AFE electrode sequence ends. Moreover, a processing system may determine which receiver electrode is associated with the analog front-end based on switching to a different capacitive mode.

In Step 440, object information is determined regarding one or more input objects using one or more resulting signals in accordance with one or more embodiments. For example, object information may include positional information similar to the positional information described in FIG. 1 and the accompanying description. Object information may also include various characteristics of an input object, such as input object size and/or the type of input object, e.g., an index finger, a palm, a user's face, stylus, etc. Likewise, a processing system may determine object information by generating a capacitive image, e.g., a transcapacitive image, from various resulting signals. The processing system may then determine object information regarding one or more input objects in a sensing region by comparing the capacitive image with one or more capacitive templates, for example.

Figure 6:
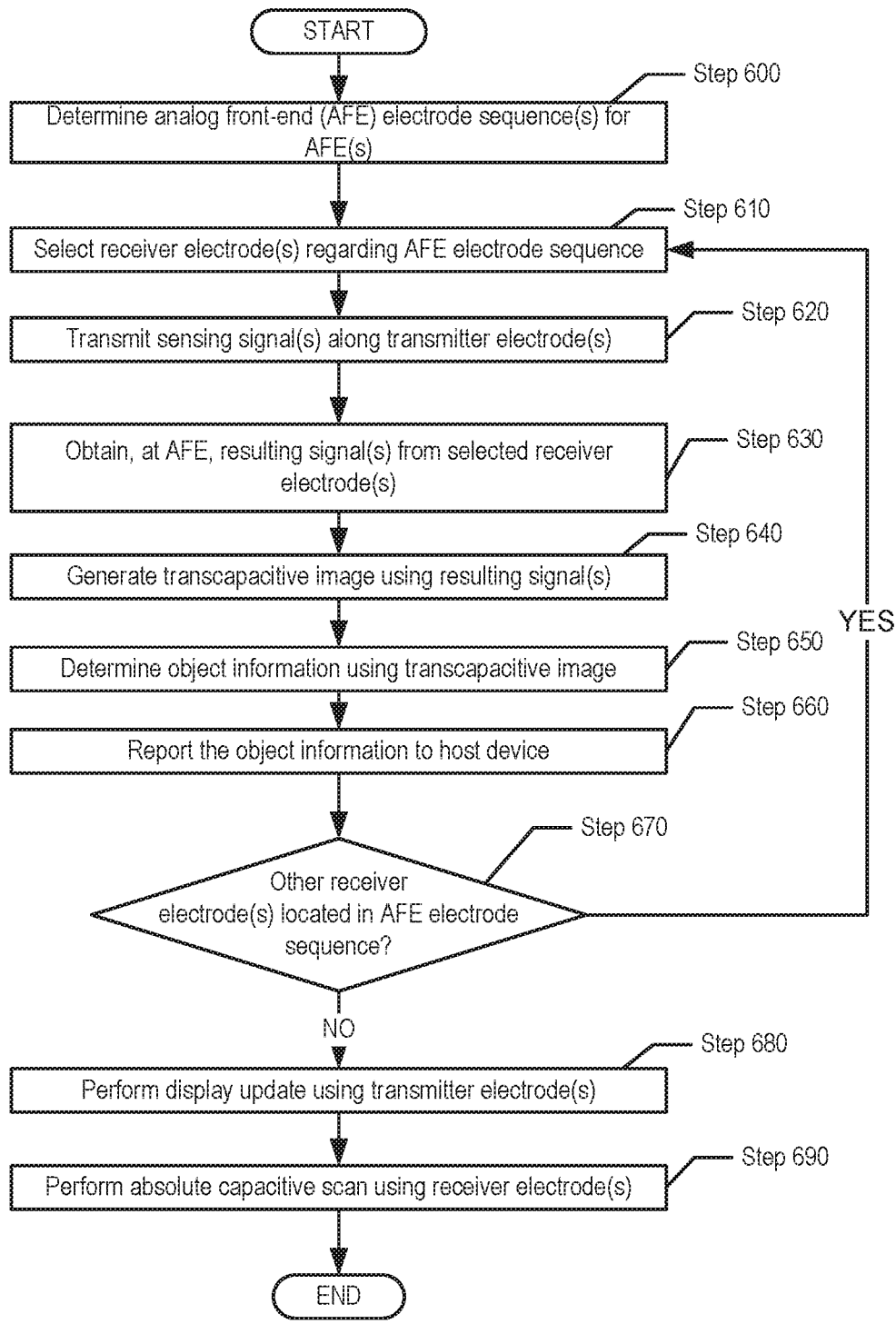
FIG. 6 shows a flowchart in accordance with one or more embodiments.

Turning to FIG. 6, FIG. 6 shows a flowchart in accordance with one or more embodiments. Specifically, FIG. 6 describes a method for performing capacitive sensing. The process shown in FIG. 6 may involve, for example, one or more components discussed above in reference to FIGS. 1, 2A, 3A and 3B (e.g., processing system (110)). While the various steps in FIG. 6 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 600, one or more AFE electrode sequences are determined for one or more analog front-ends in accordance with one or more embodiments. For example, a processing system may decide to determine a type of transcapacitive image and/or a code division multiplexing (CDM) scan to be generated using a matrix electrode array. With respect to a transcapacitive image, for example, the processing system may determine whether to generate the transcapacitive image from one capacitive scan or multiple capacitive scans. As such, the processing system may select a pre-stored analog front-end sequence in order to implement one capacitive scan or multiple capacitive scans for the transcapacitive image.

With respect to a CDM scan, for example, a CDM scan may correspond to a particular transmission code sequence within one or more sensing signals. Thus, the processing system may determine a specific AFE electrode sequence that implements the transmission code sequence using receiver electrodes associated with an analog front-end. For more information on a CDM scan, see Step 640 and the accompanying description below.

In Step 610, one or more receiver electrodes are selected regarding an AFE electrode sequence in accordance with one or more embodiments. For example, the receiver electrodes may be selected in a similar manner as described above in Step 400 of FIG. 4 and the accompanying description.

In Step 620, one or more sensing signals are transmitted along one or more transmitter electrodes in accordance with one or more embodiments. For example, sensing signals may be transmitted in a similar manner as described above in Step 410 of FIG. 4 and the accompanying description.

In Step 630, one or more resulting signals are obtained at an analog front-end from a selected receiver electrode in accordance with one or more embodiments. For example, resulting signals may be obtain in a similar manner as described above in Step 420 of FIG. 4 and the accompanying description.

In Step 640, a transcapacitive image is generated using one or more resulting signals in accordance with one or more embodiments. For example, a processing system may determine one or more transcapacitive measurements from the resulting signals to construct a transcapacitive image. The resulting signals may be the resulting signals from the selected receiver in Step 630 as well as resulting signals from a previous iteration of Steps 610-670.

In one or more embodiments, resulting signals from the selected receiver electrode provide capacitive measurements that are used for performing code-division multiplexing. For example, the resulting signals from one analog front-end may represent the sum of one polarity while a different electrode may obtain resulting signals representing a sum of the other polarity in a particular CDM code sequence. The difference in capacitive measurements between the two analog front-ends may represent a convoluted value of a capacitive scan. Likewise, the convoluted values from multiple capacitive scans may be deconvoluted by a processing system using the CDM code sequence to resolve capacitive measurements for each receiver electrode. Specifically, four capacitive scans may be obtained for a code length of 4 or a CDM4. However, capacitive scans may be obtained for any arbitrary code length, such as for a specific number of rows in an elemental block of an AFE electrode sequence.

In Step 650, object information is determined using a transcapacitive image in accordance with one or more embodiments. For example, object information may be determined in a similar manner as described above in Step 440 of FIG. 4 and the accompanying description.

In Step 660, object information is reported to a host device in accordance with one or more embodiments. For example, positional information and/or other object information may be reported to a host device, such as an electronic system coupled to an input device. On the host device, the positional information and/or the other object information may trigger one or more interface actions within a graphical user interface. For example, interface actions may include opening, moving, and/or closing windows within a graphical user interface.

In Step 670, a determination is made whether one or more unselected receiver electrodes are located in an AFE electrode sequence in accordance with one or more embodiments. For example, a processing system may determine whether the selected receiver electrode from Step 610 is the last receiver electrode in an AFE electrode sequence. Furthermore, if a capacitive image is generated using resulting signals from each receiver electrode in the AFE electrode sequence, the processing system may determine whether to return to the beginning of the AFE electrode sequence for the same type of capacitive image or switch to a different type of capacitive scan, e.g., to perform an absolute capacitive scan of a sensing region. When a determination is made that an unselected receiver electrodes remains, the process may proceed to Step 610. When a determination is made that no unselected receiver electrodes remain, the process may proceed to Step 680.

In Step 680, a display update is performed using one or more transmitter electrodes in accordance with one or more embodiments. For example, the transmitter electrodes in Step 620 may be common electrodes that include functionality for transmitting signals for capacitive sensing and display updating. For example, during a display period of a particular frame sequence, an input device may use a universal override control to transmit various signals across transmitter electrodes in a matrix electrode array for updating various display pixels within a display device coupled to an input device.

In Step 690, an absolute capacitive scan is performed using one or more receiver electrodes in accordance with one or more embodiments. Because each analog front-end may now span rows and/or columns, uniform scaling of sensor electrode size during an absolute capacitive scan may be achieved by way of ganging. Ganging of receiver electrodes to an analog front-end may allow tracking of relatively large input objects at some higher distance away from an input surface of an input device. This tracking may be performed in an equivalent manner as of ordinary input object located at the input surface. Because receiver electrodes are approximately equilateral in this ganged configuration, the signal-to-noise response may be spatially comparable along both axes of a sensing region. As such, the dynamic range of an analog front-end may be adjusted optimally along both axes of the sensing region.

Figure 7:
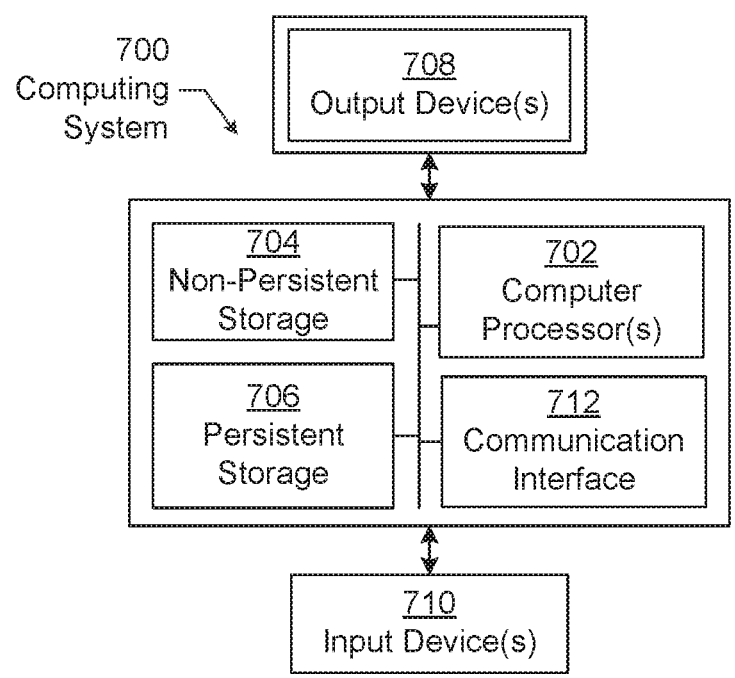
FIG. 7 shows a computing system in accordance with one or more embodiments.

Embodiments may be implemented on a computing system (700). Any combination of mobile, desktop, server, router, switch, embedded device, or other types of hardware may be used. For example, as shown in FIG. 7, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) (702) may be one or more cores or micro-cores of a processor. The computing system (700) may also include one or more input devices (710), such as a touchscreen, keyboard, mouse, microphone, touchpad, electronic pen, or any other type of input device (710).

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the disclosed technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosed technology.

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosed technology. The processes may be part of the same or different application and may execute on the same or different computing system.

Rather than or in addition to sharing data between processes, the computing system performing one or more embodiments of the disclosed technology may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosed technology, may extract one or more data items from the obtained data. For example, the extraction may be performed as follows by the computing system (700) in FIG. 7. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7, while performing one or more embodiments of the disclosed technology, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosed technology, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 7 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The computing system of FIG. 7 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system (700). For example, data may be presented to a user using a vibration generated by a handheld computer device with a predefined duration and intensity of the vibration to communicate the data.

The above description of functions presents only a few examples of functions performed by the computing system (700) of FIG. 7. Other functions may be performed using one or more embodiments of the disclosed technology.

While the disclosed technology has been described with respect to a limited number of embodiments, those skilled in the art, having benefit of this disclosed technology, will appreciate that other embodiments can be devised which do not depart from the scope of the disclosed technology as disclosed herein. Accordingly, the scope of the disclosed technology should be limited only by the attached claims.

What is claimed is:

1. An input device comprising:
a matrix electrode array comprising a first plurality of electrodes and a second plurality of electrodes,
    wherein the first plurality of electrodes are transmitter electrodes disposed in a first column, the first column comprising only transmitter electrodes, and
    wherein the second plurality of electrodes are a plurality of receiver electrodes and one transmitter electrode disposed in a second column that is substantially parallel with the first column;
a first plurality of routing traces coupled to the first plurality of electrodes and disposed underneath the first plurality of electrodes in a direction of the first column; and
a second plurality of routing traces coupled to the second plurality of electrodes and disposed underneath the second plurality of electrodes in a direction of the second column.

2. The input device of claim 1, further comprising:
a processing system coupled to the first plurality of routing traces and the second plurality of routing traces,
wherein the first plurality of routing traces is configured for reducing at least a portion of a baseline capacitance contribution in a plurality of resulting signals, and
wherein the processing system is configured for obtaining the plurality of resulting signals from the second plurality of routing traces.

3. The input device of claim 2,
wherein the processing system is configured to:
    select, based at least in part on an analog front-end (AFE) electrode sequence, a first receiver electrode among the second plurality of electrodes;
    transmit a plurality of sensing signals along the first plurality of electrodes;
    obtain, using an AFE and in response to transmitting the plurality of sensing signals, a first resulting signal from the first receiver electrode and a second resulting signal from a second receiver electrode among the second plurality of electrodes, wherein the second receiver electrode follows the first receiver electrode in the AFE electrode sequence;
    determine, using the first resulting signal and the second resulting signal, object information regarding an input object that is located in a sensing region of an input devices.

4. The input device of claim 1,
wherein the transmitter electrode of the second plurality of electrodes is configured to transmit a sensing signal that is configured for identifying whether an open circuit exists between at least one receiver electrode among the second plurality of electrodes and the second plurality of routing traces, and
wherein the one transmitter electrode in the second plurality of electrodes is located at different positions in the second column when repeatedly transmitting the sensing signal.

5. The input device of claim 1, further comprising:
a driving circuitry coupled to the first plurality of electrodes and a third plurality of electrodes in the matrix electrode array,
wherein the third plurality of electrodes are a plurality of transmitter electrodes,
wherein the driving circuitry is configured to transmit a plurality of sensing signals along the first plurality of electrodes and the third plurality of electrodes, and
wherein the third plurality of electrodes are disposed in a third column.

6. The input device of claim 1, further comprising:
an analog front-end coupled with a charge integrator, the charge integrator comprising an amplifier with an input terminal and a reference terminal,
wherein the reference terminal receives a modulating reference voltage, and
wherein the first plurality of routing traces is guarded with a waveform that is substantially the same as the modulating voltage.

7. The input device of claim 1, further comprising:
an analog front-end comprising an input terminal and a reference terminal,
wherein the input terminal is configured to receive a result signal from at least one receiver electrode among the second plurality of electrodes,
wherein the reference terminal is configured to receive a direct current (DC) reference voltage,
wherein the first plurality of routing traces comprises a first subset of routing traces and a second subset of routing traces,
wherein the first subset of routing traces is set to a predetermined DC voltage, and
wherein the second subset of routing traces are set to a high impedance (HiZ) voltage.

8. The input device of claim 1, further comprising:
a sensing circuitry coupled to the second plurality of routing traces,
wherein the sensing circuitry is configured to obtain a plurality of resulting signals from the second plurality of electrodes in response to transmitting one or more sensing signals along the first plurality of electrodes, and
wherein the plurality of resulting signals is configured for determining object information regarding an input object located in a sensing region of the input device.

9. A processing system, comprising:
a sensor module, the sensor module configured to:
    transmit a plurality of sensing signals along a plurality of transmitter electrodes, the plurality of transmitter electrodes disposed in a first column of a matrix electrode array, wherein the first column comprises only transmitter electrodes,
    obtain, using an analog front-end (AFE), a first resulting signal from a first receiver electrode among a plurality of receiver electrodes in response to transmitting a first sensing signal among the plurality of sensing signals,
        wherein the plurality of receiver electrodes is disposed in a second column of the matrix electrode array, the second column being substantially parallel with the first column, and the second column comprising the plurality of receiver electrodes and one transmitter electrode, and obtain, using the AFE, a second resulting signal from a second receiver electrode among the plurality of receiver electrodes in response to transmitting a second sensing signal among the plurality of sensing signals; and a determination module, the determination module configured to:

select the first receiver electrode to obtain the first resulting signal based at least in part on an AFE electrode sequence;

after obtaining the first resulting signal, select the second receiver electrode to obtain the second resulting signal based at least in part on the AFE electrode sequence; and determine, using the first resulting signal and the second resulting signal, object information regarding an input object that is located in a sensing region of an input device.

10. The processing system of claim 9, wherein the sensor module is further configured to transmit a sensing signal along the one transmitter electrode in the second column to identify whether an open circuit exists between at least one receiver electrode among the plurality of receiver electrodes and a plurality of routing traces coupled to the plurality of receiver electrodes.

11. The processing system of claim 9, wherein the determination module is further configured to generate a transcapacitive image based at least in part on the first resulting signal and the second resulting signal, and wherein the first resulting signal and the second resulting signal are obtained in subsequent frames of a capacitive frame sequence.

12. The processing system of claim 9, wherein the sensor module is further configured to:

obtain, using the AFE, a third resulting signal from a third receiver electrode disposed in a third column of the matrix electrode array, wherein the second column and the third column are separated by the first column.

13. The processing system of claim 9, wherein the first resulting signal comprises a first polarity in a code division multiplexing (CDM) scan, and wherein the second resulting signal comprises a second polarity in the CDM scan that is opposite the first polarity.

14. A method of capacitive sensing, comprising:

selecting, based at least in part on an analog front-end (AFE) sequence, a first receiver electrode among a plurality of receiver electrodes in a matrix electrode array, wherein an AFE, driven by the AFE sequence, is electrically connected to the first receive electrode and a second receive electrode, and wherein the matrix electrode array comprises a first plurality of electrodes and a second plurality of electrodes, wherein the first plurality of electrodes is transmitter electrodes disposed in a first column, the first column comprising only transmitter electrodes, and wherein the second plurality of electrodes is the plurality of receiver electrodes and one transmitter electrode disposed in a second column that is substantially parallel with the first column;

transmitting a first sensing signal along a transmitter electrode of the first plurality of electrodes;

obtaining, using the multiplexer circuitry of the AFE, a first resulting signal from the first receiver electrode in response to transmitting the first sensing signal;

after obtaining the first resulting signal, selecting, based at least in part on the analog front-end (AFE) sequence, the second receiver electrode among the plurality of receiver electrodes;

transmitting a second sensing signal along the transmitter electrode;

obtaining a second resulting signal from the second receiver electrode among the plurality of receiver electrodes; and determining, using the first resulting signal and the second resulting signal, object information regarding an input object that is located in a sensing region of an input device.

15. The method of claim 14, further comprising:

transmitting a third sensing signal along the one transmitter electrode in the second column of the matrix electrode array in order to identify whether an open circuit exists between at least one receiver electrode among the plurality of receiver electrodes and a plurality of routing traces coupled to the plurality of receiver electrodes.

16. The method of claim 14, further comprising:

generating a transcapacitive image based at least in part on the first resulting signal and the second resulting signal, and wherein the first resulting signal and the second resulting signal are obtained in subsequent frames of a capacitive frame sequence.

17. The method of claim 14, further comprising:

obtaining, using the AFE, a third resulting signal from a third receiver electrode disposed in a third column of the matrix electrode array, wherein the second column and the third column are separated by the first column.

18. The method of claim 14, wherein the first resulting signal comprises a first polarity in a code division multiplexing (CDM) scan, and wherein the second resulting signal comprises a second polarity in the CDM scan that is opposite the first polarity.

* * * * *